United States Patent Office 3,122,568
Patented Feb. 25, 1964

3,122,568
EPOXY ESTERS OF POLYCARBOXYLIC ACIDS
John W. Lynn, Charleston, Richard L. Roberts, Milton, and Samuel W. Tinsley, South Charleston, W. Va., assignors to Union Carbide Corporation, a corporation of New York
No Drawing. Filed May 22, 1959, Ser. No. 814,992
5 Claims. (Cl. 260—348)

This invention relates to epoxy esters of polycarboxylic acids having utility as plasticizers and stabilizers for vinyl halide resins, and as monomers for the preparation of valuable resins. In a particular aspect, this invention is directed to epoxy aliphatic esters of 1,2,4-butanetricarboxylic acids.

This invention provides aliphatic triesters of 1,2,4-butanetricarboxylic acids having at least one oxirane-containing aliphatic alcohol radical. By the term "oxirane" is meant the

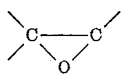

structure; and by the terms "epoxy aliphatic" radical, "epoxyalkyl" radical and "epoxyalkenyl" radical, are meant aliphatic, alkyl and alkenyl radicals, respectively, containing at least one of said oxirane structures.

A preferred class of epoxy esters of this invention are those corresponding to the general formula

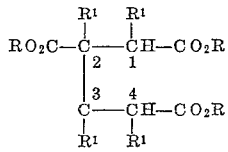

wherein $R^1$ is a member selected from the group consisting of hydrogen and lower alkyl radicals containing between one and about four carbon atoms; wherein R is an aliphatic radical and at least one R is an epoxy aliphatic radical, and the total number of carbon atoms in said R radicals is between five and about sixty carbon atoms.

Particularly preferred epoxy esters corresponding to the above general formula are those in which the aliphatic radical R is a member selected from the group consisting of alkyl radicals containing between one and eighteen carbon atoms, alkenyl radicals containing between two and eighteen carbon atoms, and epoxyalkyl and epoxyalkenyl radicals containing between two and eighteen carbon atoms, and at least one R is an epoxyalkyl radical or epoxyalkenyl radical, and the total number of carbon atoms in said R radicals is between nine and forty-eight carbon atoms. These esters can contain halogen atoms and are further characterized as being free of acetylenic unsaturation.

The above general formula is meant to include triesters of 1,2,4-butanetricarboxylic acids which have the number one and number four carbon atoms of the acid moiety connected by a methylene group as illustrated by the following structure

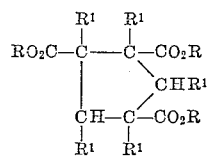

wherein R and $R^1$ are as defined hereinbefore.

Illustrative of preferred epoxy esters are those in which $R^1$ is methyl, ethyl, propyl, isopropyl, butyl, isobutyl, and the like, and R is methyl, vinyl, ethyl, allyl, propyl, isopropyl, butyl, 2-butenyl, isobutyl, tertiary-butyl, amyl, 3-pentenyl, 2-hexenyl, hexyl, heptyl, octyl, 2-octenyl, 2-ethylhexyl, 2-ethyl-2-hexenyl, nonyl, decyl, 2-decenyl, dodecyl, tridecyl, octadecyl, 9-octadecenyl, and epoxy aliphatic radicals such as 2,3-epoxypropyl, 2,3-epoxybutyl, 2-chloro-3,4-epoxybutyl, 2,3-epoxy - 2 - ethylhexyl, 3,4-epoxy-1-butenyl, the epoxidized derivatives of the foregoing alkenyl radicals wherein the double bond is converted into an oxirane group, and other similar aliphatic radicals. Typical preferred epoxy aliphatic esters include tris(2,3-epoxypropyl) 1,2,4-butanetricarboxylate;
tris(9,10-epoxyoctadecyl) 1,2,4-butanetricarboxylate;
tris(2,3-epoxy-2-ethylhexyl) 1,2,4-butanetricarboxylate;
2,3-epoxypropyl diallyl 1-chloro-1,2,4-
  butanetricarboxylate;
2,3-epoxypropyl bis("oxo" decyl) 1,2,4-
  cyclopentanetricarboxylate;
2,3-epoxy-2-ethylhexyl bis(2-ethyl-2-hexenyl)
1,2,3,4-tetrafluoro-1,2,4-butanetricarboxylate;
bis(2,3-epoxybutyl) vinyl 2-butyl-1,2,4-
  butanetricarboxylate;
2,3-epoxy-2-ethylhexyl ethyl 2-ethylhexyl 1,2,4-
  butanetricarboxylate; and the like.

The epoxy aliphatic esters of this invention are readily prepared by the epoxidation of the corresponding olefinic esters. Preferred epoxidation methods involve the use of peracetic acid or acetaldehyde monoperacetate as the epoxidizing agent.

Epoxidation employing acetaledehyde monoperacetate proceeds as illustrated in the following equation with tris(2-ethyl-2-hexenyl) 1,2,4-butanetricarboxylate as the olefinic starting material:

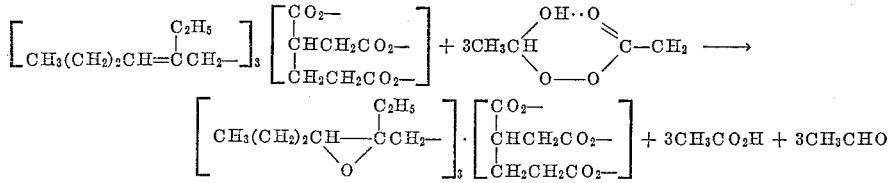

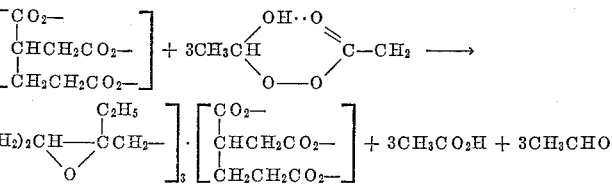

Epoxidation employing peracetic acid proceeds as illustrated in the following equation with tris(9-octadecenyl) 1,2,4-butanetricarboxylate as the olefinic starting material:

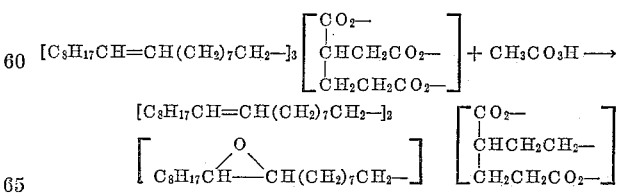

The suitable olefinic ester starting materials which are epoxidized to produce the novel epoxy esters of this invention are readily prepared by conventional esterification and transesterification methods from appropriate aliphatic alcohols and 1,2,4-butanetricarboxylic acids. In one direct esterification method, an alcohol such as 2-ethyl-2-hexen-1-ol is reacted with a polycarboxylic acid such as 1,2,4-butanetricarboxylic acid in the presence of a strong acid catalyst such as paratoluenesulfonic acid with the continuous removal of water as an azeotrope with an entraining agent such as benzene or toluene. In another direct esterification method, the alcohol is reacted with the tricarboxylic acid in the form of its acid halide derivative in the presence of an acid-binding substance such as pyridine. In the transesterification method, an alcohol such as 9-octadecen-1-ol is reacted with an ester derivative such as triethyl 1,2,4-butanetricarboxylate in the presence of a catalyst such as tetraalkyl titanate with the continuous removal of the replaced alcohol (e.g., ethanol) as a solitary distillation component or as an azeotrope with toluene or a similar entraining agent. The quantities of acid and alcohol reacted may be varied over broad molar ratios but it is usually preferred to employ either stoichiometric quantities of acid and alcohol or a small molar excess of alcohol. For example, for the preparation of an ester which has three similar alcohol moieties, the unsaturated aliphatic alcohol is reacted with the 1,2,4-butanetricarboxylic acid in the ratio of three moles of alcohol for each mole of tricarboxylic acid. In the case of an ester which has dissimilar alcohol moieties, the respective alcohols are employed in the appropriate ratios. For example, when three different alcohols are to be reacted with a 1,2,4-butanetricarboxylic acid, a ratio of one mole of each of the alcohols is employed for each mole of tricarboxylic acid. The alcohols can be reacted individually with the tricarboxylic acid, or the alcohols can be reacted simultaneously as a single mixture with the tricarboxylic acid. In either case, an equilibrium reaction product is formed.

The epoxy aliphatic esters of this invention can also be prepared directly by the interaction of suitable epoxy aliphatic alcohols with 1,2,4-butanetricarboxylic acids. This method is not preferred because of the various side reactions which can occur.

The class of 1,2,4-butanetricarboxylic acids useful for the production of the novel esters of this invention are available by several preparative routes which are reported in the chemical literature. For example, 1,2,4-butanetricarboxylic acid can be prepared by the Michael condensation of methylene-succinic acid ester with malonic ester, or by the condensation of acrylonitrile, with 1,1,2-ethanetricarboxylic acid. A preferred method of preparing 1,2,4-butanetricarboxylic acids is by the nitric acid oxidation of cyclohexene derivatives corresponding to the formulas

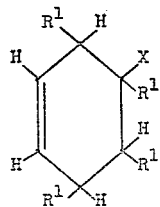 and 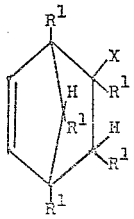

wherein X is a carboxyl group or a group convertible to a carboxyl group such as cyano, keto and amido groups, and $R^1$ is hydrogen or a lower alkyl group containing between one and four carbon atoms. The appropriate cyclohexene derivatives, in turn, are prepared by the Diels-Alder reaction of butadiene and other compounds of the conjugated diene series with mono-olefinic dienophiles having the double bond in a position vinyl to a carboxyl group or a group convertible to a carboxyl group. Suitable dienophiles are illustrated by acrylic acid, crotonic acid, methacrylic acid, acrylonitrile, alkyl acrylate, alkyl methacrylate, acrylamide, N,N-dialkyl-crotonamide, and the like. Among the suitable conjugated dienes are included cyclopentadiene, butadiene, piperylene, isoprene, and the like.

As mentioned above, the epoxy aliphatic esters of this invention are useful as plasticizers and as heat and light stabilizers for vinyl halide resins and as monomers for the preparation of valuable resins. For example, tris(9,10-epoxystearyl) 1,2,4-butanetricarboxylate has good low temperature performance as a plasticizer for poly(vinyl chloride), and tris(2,3-epoxy-2-ethylhexyl) 1,2,4-butanetricarboxylate is superior to "Paraplex" G-62 (epoxidized soybean oil) as a light stabilizer for poly(vinyl chloride).

The epoxy aliphatic esters are susceptible to polymerization by way of the epoxy groups. The polymerization can proceed by epoxy-epoxy interaction, or by interaction of epoxy groups with other functional groups such as anhydride and active hydrogen groups. Compounds containing active hydrogen groups are illustrated by polycarboxylic acids and polyhydric alcohols and phenols. The epoxy aliphatic esters containing olefinic unsaturation, e.g., bis(2,3-epoxypropyl) vinyl 1-butyl-1,2,4-butanetricarboxylate, have the additional feature of being polymerizable both through the epoxy groups and through the olefinic groups. These two dissimilar groups react to form polymers by entirely different reaction mechanisms. The unsaturated epoxy ester can be subjected to conditions whereby polymerization occurs through one kind of group to the exclusion of polymerization through the other kind of group. The resulting polymer then can be further polymerized under the proper conditions through the unaffected second kind of group so that a more rigid, tougher resin is formed. For example, an unsaturated epoxy ester of this invention can be copolymerized with a vinyl monomer such as vinyl chloride to form a copolymer containing unreacted epoxide groups which could then be cross-linked by treatment with acid or base to induce reaction of the available epoxide groups. Or, on the other hand, an ester of this invention can be copolymerized with a monomer such as ethylene oxide or ethylenediamine to form a copolymer which contains double bonds capable of cross-linking by treatment with a peroxide or by heat at an elevated temperature. The dissimilarity of the polymer-forming epoxy and olefin groups enables control over polymer formation so as to produce polymers having a great variety of properties.

The following examples will serve to illustrate specific embodiments of the invention.

*Example 1*

A solution (915 grams) of 21.5 percent peracetic acid in ethyl acetate was added dropwise to tris(2-ethyl-2-hexenyl) 1,2,4-butanetricarboxylate (309 grams) at a temperature of 50° C. over a period of ninety minutes. After an additional three hours at 50° C., analysis of the mixture for peracetic acid indicated that the reaction was complete. The reaction mixture was then fed dropwise to an equal volume of ethylbenzene which was refluxing in a distillation apparatus at a pressure of 25 to 30 millimeters of mercury. Ethyl acetate, acetic acid and excess peracetic acid together with ethylbenzene were distilled off overhead. The concentrated reaction mixture consisted of tris(2,3-epoxy-2-ethylhexyl) 1,2,4-butanetricarboxylate having the following properties: 6.75 percent oxirane oxygen (80 percent purity), 0.31 percent acid (calculated as acetic acid), iodine value (Wijs' method) 1.09, and color less than 1 Gardner.

*Example 2*

A solution (1980 grams) of 26.1 percent peracetic acid in ethyl acetate was fed dropwise to triallyl 1,2,4-butanetricarboxylate (527 grams) at a temperature of 55° C. to 60° C. over a period of five hours. After an additional six and one-half hours at 60° C. to 65° C. the mixture was stripped of volatiles by passing through a steam-heated evaporator. Triglycidyl 1,2,4-butanetricarboxylate (616 grams) was recovered as a residue product which contained 7.6 percent oxirane oxygen by epoxide analysis.[1]

*Example 3*

A solution (392 grams) of 27.9 percent peracetic acid in ethyl acetate was added dropwise to trioleyl 1,2,4-butanetricarboxylate (380 grams) at a temperature of 45° C. to 50° C. over a period of fifty minutes. After five hours of additional heating at 45° C. to 50° C., all volatile materials were removed under vacuum distillation. Tris(9,10-epoxyoctadecyl) 1,2,4-butanetricarboxylate (394 grams) was obtained as a residue product which contained 3.89 percent oxirane oxygen by epoxide analysis.

*Example 4*

A solution (267 grams) of 27.6 percent peracetic acid in ethyl acetate was added dropwise to triallyl 1,2,4-butanetricarboxylate (290 grams) at a temperature of 50° C. over a period of one hundred five minutes. After three hours of additional heating at 50° C., the temperature was raised to 60° C. and maintained for three and one-half hours, at which time analysis indicated the reaction to be substantially complete. As in Example 1, volatile materials were distilled with ethylbenzene from the reaction mixture. There was obtained 146 grams of product, boiling point 168° C. at a pressure of 0.06 millimeter of mercury, which had as a major component 2,3-epoxypropyl diallyl 1,2,4-butanetricarboxylate, and there was obtained 45 grams of product, boiling point 186° C. at a pressure of 0.14 millimeter of mercury, which contained as a major component di(2,3-epoxypropyl) allyl 1,2,4-butanetricarboxylate. The pyridine hydrochloride method was employed to determine the epoxide content of the products.

*Example 5*

A solution of ethyl acetate containing 20–30 percent by weight of peracetic acid (approximately 3.6 moles) is added dropwise to trioleyl 1,2,4-cyclopentanetricarboxylate (approximately 1.0 mole) at a temperature of 45° C. to 50° C. over a period of one hour. After five hours of additional heating at 45° C. to 50° C., all volatile materials are removed by feeding the mixture dropwise to an equal volume of ethylbenzene which is refluxing in a distillation apparatus at a pressure of 25 to 30 millimeters of mercury. Ethyl acetate, acetic acid and excess peracetic acid, together with ethyl benzene are distilled off overhead. The concentrated reaction product consists of tris(9,10-epoxyoctadecyl) 1,2,4-cyclopentanetricarboxylate.

*Example 6*

A solution of ethyl acetate containing 20–30 percent by weight of peracetic acid (approximately 4.5 moles) is added dropwise to tris(2-ethyl-2-hexenyl) 1,2,4-cyclopentanetricarboxylate (approximately 1.0 mole) at a temperature of 50° C. over a period of about 1.5 hours. After an additional three hours of heating at 50° C., the reaction mixture is fed dropwise to an equal volume of ethylbenzene which is refluxing in a distillation apparatus at a pressure of 25 to 30 millimeters of mercury. Ethyl acetate, acetic acid and excess peracetic acid, together with ethylbenzene are distilled off overhead. Tris(2,3-epoxy-2-ethylhexyl) 1,2,4-cyclopentanetricarboxylate is obtained as a residue product.

*Examples 7 through 12*

One-gram portions of triglycidyl 1,2,4-butanetricarboxylate were mixed with acidic and basic hardeners in the proportions indicated in the following table. Gel times were observed and the resulting gels were postcured as indicated.

| Ex. No. | Hardener | Grams | Ratio [a] | Gel Time, Minutes, ° C. | Cure, Hours, ° C. | Resin Description |
|---|---|---|---|---|---|---|
| 7 | Diethylenetriamine | 0.11 | 1.0 | 40, 26 | 24, 26; 5.5, 80; 2.5, 120; 6, 160. | Brown, tough, Barcol, 0. |
| 8 | p,p'-Methylenedianiline | 0.25 | 1.0 | 30, 120 | 7, 120; 6, 160 | Amber, tough, Barcol, 37. |
| 9 | Phthalicanhydride | 0.55 | 1.5 | 15, 120 | 6, 120; 6, 160 | Yellow, tough, Barcol, 33. |
| 10 | Potassium hydroxide | (b) | 0.4% | after 12, 120 | 18, 26; 5.5, 80; 2.5, 120; 6, 160. | Brown, tough, Barcol, 0. |
| 11 | Sulfuric acid | (c) | 0.4% | after 60, 80 | 19, 26; 5.5, 80; 2.5, 120; 6, 160. | Brown, Barcol, 20. |
| 12 | BF₃-piperidine | 0.05 | 5.0% | 50, 120 | 3, 120; 6, 160 | Brown, tough, Barcol, 0. |

[a] Ratio of amino-hydrogen or carboxyl groups per epoxy group.
[b] Added as a 17.3 percent solution in water.
[c] Added as a 15 percent solution in water.

What is claimed is:
1. An epoxy ester of the formula:

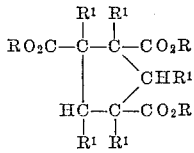

wherein $R^1$ is a member selected from the group consisting of hydrogen and lower alkyl containing between one and four carbon atoms; R is a radical selected from the group consisting of alkyl of from one to eighteen carbon atoms; alkenyl, epoxyalkyl and epoxyalkenyl of from two to eighteen carbon atoms, and at least one of the radicals represented by R is an epoxy radical as aforesaid, and the total number of carbon atoms in said R radical is between five and about sixty carbon atoms.

2. Tris(9,10-epoxyoctadecyl) 1,2,4-cyclopentanetricarboxylate.
3. Tris(2,3-epoxy-2-ethylhexyl) 1,2,4-cyclopentanetricarboxylate.
4. 2,3-epoxypropyl diallyl 1,2,4-butanetricarboxylate.
5. Bis(2,3-epoxypropyl) allyl 1,2,4-butanetricarboxylate.

References Cited in the file of this patent

UNITED STATES PATENTS

| | | |
|---|---|---|
| 2,476,922 | Shokal et al. | July 19, 1949 |
| 2,781,333 | Updegraff | Feb. 12, 1957 |
| 2,783,250 | Payne et al. | Feb. 26, 1957 |
| 2,890,210 | Phillips et al. | June 9, 1959 |
| 2,895,947 | Shokal et al. | July 21, 1959 |
| 2,935,492 | Newey | May 3, 1960 |
| 3,057,880 | Lynn et al. | Oct. 9, 1962 |
| 3,062,871 | Lynn et al. | Nov. 6, 1962 |

FOREIGN PATENTS

| | | |
|---|---|---|
| 559,078 | Canada | June 17, 1958 |

[1] Pyridine hydrochloride method.